United States Patent
Gey

(10) Patent No.: US 8,251,190 B2
(45) Date of Patent: Aug. 28, 2012

(54) VENTILATED BRAKE DISC AND CORRESPONDING VEHICLE

(75) Inventor: Yves Gey, Guecelard (FR)

(73) Assignee: Auto Chassis International SNC, Le Mans (FR)

( * ) Notice: Subject to any disclaimer, the term of this patent is extended or adjusted under 35 U.S.C. 154(b) by 948 days.

(21) Appl. No.: 11/631,473

(22) PCT Filed: Jun. 16, 2005

(86) PCT No.: PCT/EP2005/052787
§ 371 (c)(1),
(2), (4) Date: Oct. 12, 2007

(87) PCT Pub. No.: WO2006/010671
PCT Pub. Date: Feb. 2, 2006

(65) Prior Publication Data
US 2008/0302615 A1  Dec. 11, 2008

(30) Foreign Application Priority Data
Jul. 8, 2004 (FR) ...................................... 04 07659

(51) Int. Cl.
*F16D 65/12* (2006.01)
(52) U.S. Cl. ............................... 188/264 A; 188/218 XL
(58) Field of Classification Search ............ 188/218 XL, 188/18 A, 264 A, 264 AA, 264 R; D12/180
See application file for complete search history.

(56) References Cited

U.S. PATENT DOCUMENTS

| | | | |
|---|---|---|---|
| 3,955,650 A * | 5/1976 | Ellis ............................. | 188/71.1 |
| 4,164,993 A * | 8/1979 | Kobelt .................... | 188/218 XL |
| 4,865,167 A * | 9/1989 | Giorgetti et al. ........ | 188/218 XL |
| 5,139,117 A * | 8/1992 | Melinat .................... | 188/218 XL |
| 5,526,905 A | 6/1996 | Shimazu et al. | |
| 5,542,503 A * | 8/1996 | Dunn et al. ................. | 188/18 A |
| 6,119,820 A | 9/2000 | Steptoe et al. | |
| 6,367,598 B1 * | 4/2002 | Sporzynski ............. | 188/218 XL |
| 2004/0118644 A1 * | 6/2004 | Oberti et al. ............ | 188/218 XL |
| 2004/0188196 A1 * | 9/2004 | Gavin ..................... | 188/218 XL |
| 2009/0272609 A1 * | 11/2009 | Karthik et al. ......... | 188/264 AA |
| 2011/0108378 A1 * | 5/2011 | Leone et al. ............ | 188/218 XL |

FOREIGN PATENT DOCUMENTS
WO  02 064992  8/2002
WO  02 097291  12/2002

* cited by examiner

*Primary Examiner* — Bradley King
*Assistant Examiner* — Nicholas J Lane
(74) *Attorney, Agent, or Firm* — Oblon, Spivak, McClelland, Maier & Neustadt, L.L.P.

(57) ABSTRACT

A brake disc including two plates spaced apart from each other and connected together by ventilating blocks distributed in concentric circular rows including a first outlet row of blocks through which air exits the gap between the two plates and a second row upstream of the outlet row along the air flow direction. The blocks angularly offset from one row to the next. The blocks of the outlet row and of the upstream row are arranged to provide between them a first ring wherein the air entering between the plates is compressed, and a second ring wherein the air compressed in the first ring is sucked and then evacuated from the gap between the plates.

14 Claims, 3 Drawing Sheets

VENTILATED BRAKE DISC AND CORRESPONDING VEHICLE

BACKGROUND

The invention relates to the field of the automotive industry. More precisely, the invention relates to brake disks of the type comprising two mutually spaced plates connected one to the other by ventilation studs.

A brake disk must be able to store the calories absorbed in the course of a braking and to return them sufficiently quickly between two successive brake applications.

The object of this is to avoid altering the coefficient of friction between the brake pad and the material of the braking track of the disk, which allows the braking distances not to be substantially altered.

Within the field of the invention, a distinction is made between "full" or "mass" disks and "ventilated" disks.

"Mass" disks are designed to store a large quantity of heat. They therefore constitute high-capacity calorie stores, the return of the calories being realized very slowly.

The drawbacks of these disks are as follows:
  they constitute a relatively sizeable "unsprung" mass, rarely fully utilized;
  they give rise to an overconsumption of fuel (on account of their weight);
  they give rise to an energy "pollution" (through reaccumulation of calories).

The ventilated disks comprise two plates (braking tracks) between which a heat-exchanging fluid circulates and are designed to store a small quantity of energy, with a rapid return. Although these disks are less compact then mass disks, they allow:
  a reduction of the "unsprung" mass;
  an optimal utilization of the thermal capacity of the disk;
  decreased fuel consumption;
  reduced energy pollution.

This being the case, the ventilation elements provided between the plates must be designed (shape, arrangement) so as to make best use of the mechanical properties of the fluids with respect to the inflow and outflow of the heat-exchanging fluid.

A number of methods for ventilated disks are currently known, the ventilation thereof being obtained with a variety of means whose effectiveness is sometimes debatable and whose justification, in terms of the effect of the means applied to the ventilation, is not always clearly established.

In practice, the ventilation means are most often empirically designed and evolve in the course of the problems encountered during the production and/or the use of the parts.

According to a method illustrated by FIG. 1, the ventilation means are constituted by vanes which connect the two brake tracks and the longitudinal axis of which (viewed from above) converges toward the center of rotation of the disk. The term "vanes" is used where the length of the ventilation element has a length greater than or equal to 50% of the width of the braking track.

These vanes achieve a relatively satisfactory result in terms of the convection-based heat exchange surface.

At the same time, these vanes achieve limited results as regards their capacity to:
  provide a large conduction-based heat exchange surface;
  accelerate the circulation velocity of the air independently of the environment;
  increase the air flow.

On the other hand, such vanes produce very unsatisfactory results as regards their capacity to limit deformations of the track under the influence of the temperature and of the pressure applied to the disk by the brake pads.

In order to improve the performance of these vanes, one variant consists in realizing a rounded protuberance (giving the vanes the shape of a water droplet) on the side of the periphery of the disk.

According to another method illustrated by FIG. 2, the ventilation means are constituted by studs connecting the two brake tracks, with or without longitudinal axis (in the presence of longitudinal axes, these converging toward the center of rotation of the disk). The term "studs" is used where the size of the ventilation means in a radial direction is less than or equal to 50% of the width of the braking track.

As can be seen from FIG. 2, the studs 20 can have a variety of shapes; in the present case, the studs of the inner and outer rows have an oval shape, whereas the studs of the intermediate row have a diamond shape.

Such studs achieve relatively satisfactory results as regards their capacity to:
  provide a large convection-based heat exchange surface;
  provide a large conduction-based heat exchange surface;
  accelerate the circulation velocity of the air independently of the environment;
  increase the air flow;
  limit the deformations of the track under the influence of the temperature and of the pressure applied to the disk by the brake pads.

Nevertheless, the performance of such a ventilated disk is linked to the number of studs used.

Now, the increase in number of these studs gives rise to problems at the casting stage, especially in that the realization of the casting cores becomes very complex.

Moreover, with such studs it is found that these form obstacles to the pouring of the material into the casting molds, leading to a greater or lesser number of cast-offs.

According to a third solution illustrated by FIG. 3, the ventilation means comprise small columns 30, which extend from one of the tracks but without connecting the latter to the other track. It will be noted that these small columns are generally combined with studs 20 and/or vanes 10.

Such a method has limited results as regards the capacity to:
  accelerate the circulation velocity of the air independently of the environment;
  increase the air flow.

BRIEF SUMMARY

A particular object of the invention is to alleviate these drawbacks of the prior art.

More precisely, the object of the invention is to propose a ventilated brake disk, the ventilation means of which allow the calories accumulated during a braking to be more rapidly returned.

Another object of the invention is to provide a ventilated disk of this kind which allows an increase in the flow rate and/or velocity of the air circulating between the plates of the disk.

Yet another object of the invention is to provide a ventilated disk of this kind which allows a reduction in the deformations of the plates which are prone to appear between the ventilation elements.

A further object of the invention is to provide a ventilated disk of this kind in which ventilation elements offer both a large convection-based and a large conduction-based heat exchange surface.

Another object of the invention is to provide a ventilated disk of this kind which is simple of design and inexpensive to produce.

Yet another object of the invention is to provide a ventilated disk of this kind which can be foundry-made with a reduced risk of incidence of cast-offs.

These objects, as well as others which will emerge below, are achieved by virtue of the invention, the subject of which is a brake disk comprising two mutually spaced plates connected one to the other by ventilation studs distributed in concentric circular rows, comprising a first row of studs, known as the outlet row, through which the air leaves the space between said plates, and a second row, known as the upstream row, upstream of said outlet row in the direction of the air flow, said studs being angularly offset from one row to the other, characterized in that said studs of said outlet row and of said upstream row are arranged such as to provide between them a first ring, in which the air entering between said plates is compressed, and a second ring, in which the compressed air in said first ring is aspirated, then evacuated from said space between said plates.

A ventilated disk is thereby obtained, the ventilation means of which allow the velocity and the flow of air between the plates to be accelerated independently of the environment.

By way of indication, a ventilated disk according to the invention, comprising, for example, seventy-two ventilation elements, requires 160 seconds to pass from a temperature of 450° C. to 250° C. under defined operating conditions.

Under these same operating conditions, a studded disk of the prior art (such as that illustrated by FIG. 2, having 90 elements) requires 170 seconds and a vaned disk (such as that illustrated by FIG. 3, having 36 elements) requires 190 seconds. In other words, a disk according to the invention allows a reduction in cooling time of 6% and 16% respectively in relation to the two disks of the prior art which have just been cited.

This is explained, in particular, by the presence of a compression ring upstream of the aspiration ring, which tends to produce a venturi effect of such a nature as to accelerate the flow rate and velocity of the air.

Moreover, the arrangement of the ventilation studs into just two concentric rows allows the use of a relatively large number of studs without necessitating the realization of complex casting cores and without running the risk of defects, as is the case with studded disks of the prior art.

Moreover, the ventilation studs can be arranged in such a way that they allow a marked reduction to be envisaged in the deformations of the plates under the action of the brake pads, the machine-cutting tool and the flanging forces, or, indeed, under the effect of the increases in temperature of the plates.

Comparative tests have been conducted with two previously used disks for comparisons of the cooling time. These tests were conducted under a pressure of 100 bar (corresponding to a brake caliper pressure) and at a temperature of 300° C.

The results show that a disk according to the invention allows deformation reductions to be envisaged of almost 100% in relation to previous studded disks and of almost 1000% in relation to vaned disks.

Furthermore, the ventilation studs of a disk according to the invention can be realized in a number and with shapes such that they offer both a large convection-based and a large conduction-based heat exchange surface.

Advantageously, said studs of said upstream row delimit between them spaces, the width of which decreases in the direction of said outlet row.

Compression zones distributed into a ring are thus obtained, this in a very simple and effective manner.

According to one advantageous solution, said studs of said upstream row have an axis of symmetry corresponding to a radius of said disk.

Preferably, said studs of said upstream row preferably have an oblong shape, the perimeter of which is delimited by two rounded ends connected by two rectilinear portions, said rounded ends having, transversely, distinct dimensions, such that said studs have a progressive widening between said ends.

According to another characteristic, said studs of said upstream row delimit between them spaces, the width of which increases in the direction of the periphery of said disk.

The studs of the outlet row and the studs of the upstream row are thereby laid out in such a way as to offer increased resistance in the hottest zone (comet) of the disk at the moment the brake is applied.

Thus, aspiration zones are created for the compressed air in the compression zones, this with an acceleration of the air due to the aforementioned venturi effect.

The aspirated air is directly expelled, with no obstacle likely to slow its velocity.

According to one advantageous solution, said studs of said outlet row have an axis of symmetry corresponding to a radius of said disk.

Preferably, said studs of said outlet row preferably have an oblong shape, the perimeter of which is delimited by two rounded ends connected by two rectilinear portions, said rounded ends having, transversely, distinct dimensions, such that said studs have a progressive widening between said ends.

According to a preferred solution, the axis of symmetry of each stud of a row is angularly centered between the axes of symmetry of the adjacent studs of the other row.

The circulation of the air is thus distributed homogenously over the whole of the surface of the plates.

According to one advantageous solution, said outlet row and said upstream row are separated from one another by an intermediate ring.

A passage is thus created for the circulation of the air. Moreover, this spacing between the rows of studs allows a good circulation, also, for the flow of material into the casting mold.

In terms of flow behavior, in fact, what is true for air is equally true for the molding process for the ventilation elements.

An inventive arrangement of the ventilation studs therefore allows a better flowing of the sand/resin mix which is generally used to realize the cores.

This arrangement also allows the risks of a lack of filling to be significantly reduced.

According to a preferred embodiment, said studs of said upstream row are arranged such that the spaces between them are angularly offset in relation to the air inlet openings between said plates.

A kind of air pump is thus created, which helps to increase the flow of air circulating between the plates.

According to one advantageous solution, said studs of said outlet row, said studs of said upstream row and air inlet openings between said plates are arranged staggered in relation to one another.

Such a characteristic produces a turbine-like functioning, which helps, of course, to increase (in terms of velocity and flow rate) the air flow circulating between the plates.

Another advantage of such a disk structure is that it is not necessary to differentiate the disks for the right-side wheels from those for the left-side wheels.

According to a first embodiment, said studs of said outlet row, said studs of said upstream row are distributed according to a regular pitch.

According to a second embodiment, said studs of said outlet row, said studs of said upstream row are distributed according to a variable pitch.

The invention also relates to an automotive vehicle equipped with at least one brake disk comprising two mutually spaced plates connected one to the other by ventilation studs distributed in concentric circular rows, comprising a first row of studs, known as the outlet row, through which the air leaves the space between said plates, and a second row, known as the upstream row, upstream of said outlet row in the direction of the air flow, said studs being angularly offset from one row to the other, characterized in that said studs of said outlet row and of said upstream row are arranged such as to provide between them a first ring, in which the air entering between said plates is compressed, and a second ring, in which the compressed air in said first ring is aspirated, then evacuated from said space between said plates.

BRIEF DESCRIPTION OF THE DRAWINGS

Other characteristics and advantages of the invention will be more clearly apparent from a reading of the following description of a preferred embodiment of the invention, given by way of illustrative and non-limiting example, and the appended drawings, among which.

DETAILED DESCRIPTION

As already previously mentioned, the principle of the invention lies in the provision of concentric rows of studs, one upstream, intended to compress the air entering into the disk, and the other intended to aspirate and evacuate the compressed air in the upstream row.

Figure 1:
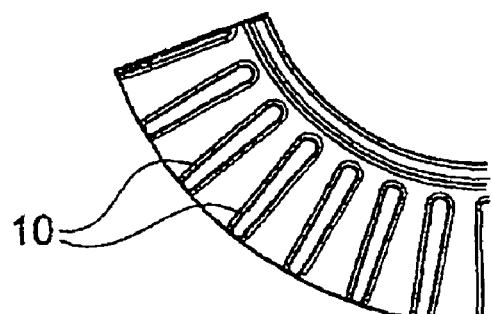
FIGS. 1 to 3 are partial views of ventilated disks according to the prior art.
Figure 2:
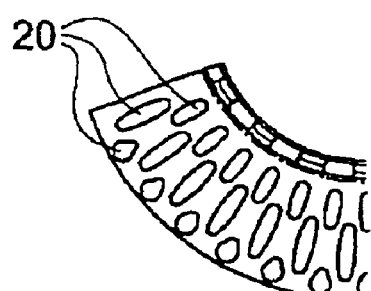
Figure 3:
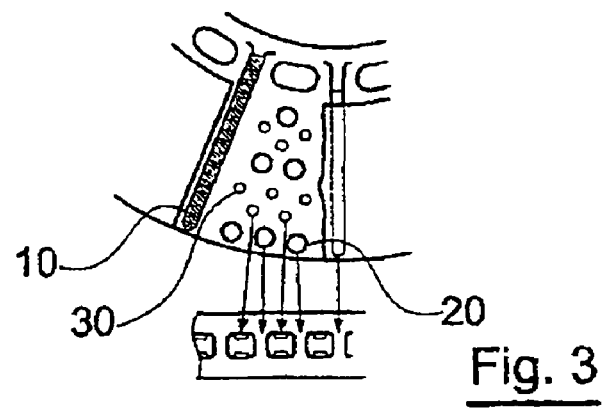
Figure 4:
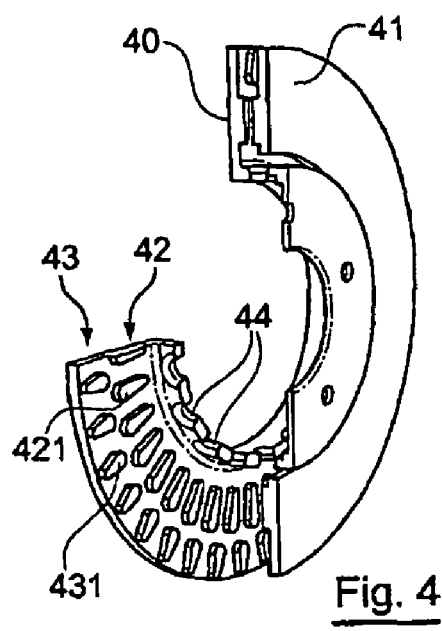
FIG. 4 is a perspective view in partial section of a ventilated disk according to the invention.
Figure 6:
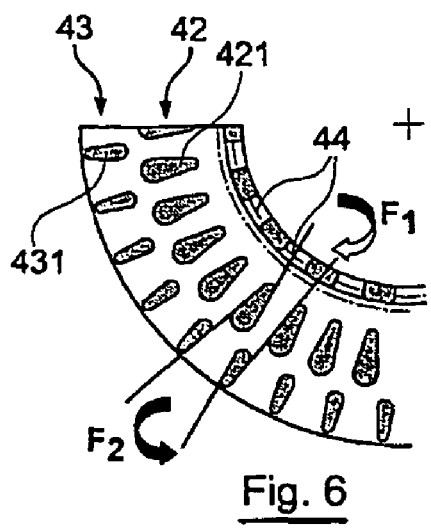
FIGS. 6 and 7 are partial sectional views of a ventilated disk according to the invention, intended to illustrate the air flows in the disk.
Figure 7:
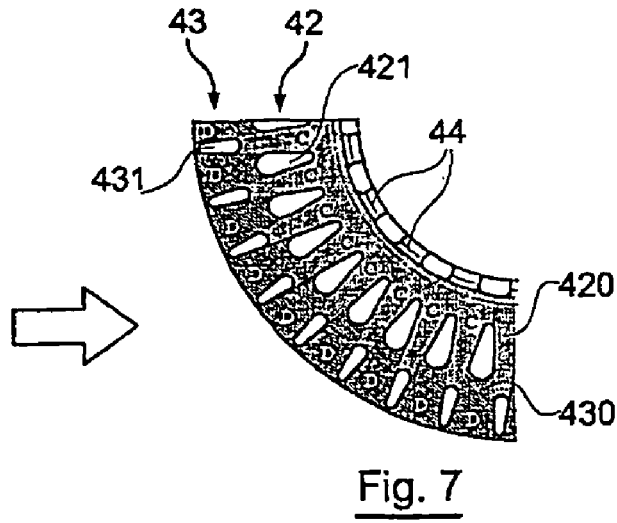

This is illustrated by FIGS. 4, 6 and 7, which show a ventilated disk comprising two plates (braking tracks) 40, 41 connected one to the other by two rows 42, 43 of studs 421, 431.

In the remainder of the description, the row 42 of studs is referred to as the "upstream row" and the row 43 is referred to as the "outlet row".

Such a disk additionally has air inlet (intake) openings 44 between the plates.

According to the principle of the invention, the studs 421 of the row 42 and the studs 431 of the row 43 are arranged in such a way as to provide:

a first ring 420 (marked "C" for "Compression" in FIG. 7) in which the air entering through the openings 44 (as indicated by the arrow F1 in FIG. 6) is compressed;

a second ring 430 (marked "D" for "Depression" in FIG. 7) in which the compressed air in the ring 420 is aspirated, then evacuated from the space between the plates (as indicated by the arrow F2 in FIG. 6).

According to the present embodiment, the studs 421 of the upstream row 42 delimiting between them spaces, the width of which diminishes in the direction of the ring 430 (whence the compression phenomenon of such a nature as to produce a venturi effect).

At the same time, the studs 431 of the outlet row 43 delimit between them spaces, the width of which increases in the direction of the periphery of the disk (which helps to give rise to a depression phenomenon of such a nature as to cause the aspiration of the air from the ring 420).

As can be seen, the studs 421, 431 of the rows 42, 43 are distributed between the plates according to a regular pitch (according to one conceivable embodiment, the pitch between the studs being able to be variable, a variable pitch allowing the vibratory modes of the brake tracks to be tuned, if necessary, such as to create neither sound nor vibration in the braking). The studs will thus be able to be arranged according to successive pitch sequences, for example with angular deviations between studs of 10°, 9°, 8°, then, once again, 10°, 9°, 8°, etc.

It will be noted that the studs 421, 431 of the rows 42, 43 each have an axis of symmetry extending radially from the center of rotation of the disk.

Preferably, the studs 421 and 431 have an oblong shape delimited by two rounded ends connected by two rectilinear portions. Furthermore, the rounded ends of the studs have distinct dimensions, lending the studs a progressively widening shape.

Figure 8:
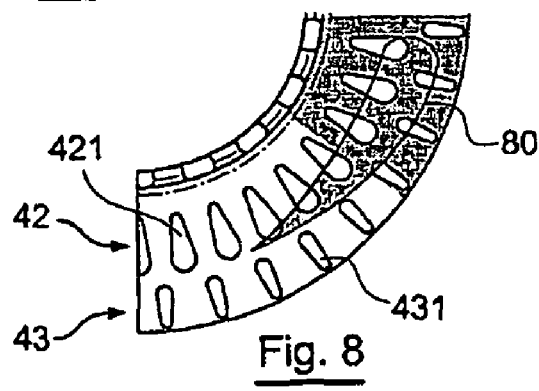
FIG. 8 is another partial sectional view of a ventilated disk according to the invention, intended to illustrate the distribution of the studs in relation to the heat zone produced by a brake application.

Since the studs are suitably shaped and arranged according to the principle of the invention, a layout is obtained which confers a reinforcement of the disk in the comet-shaped heating zone 80 (FIG. 8) generated by a brake application.

Figure 5:
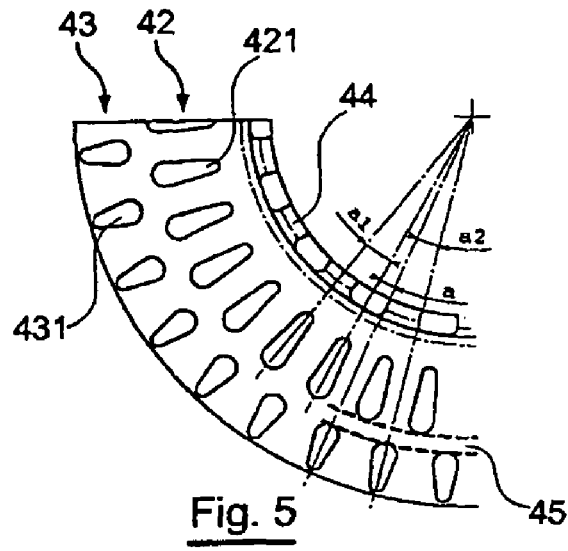
FIG. 5 is a partial sectional view of a ventilated disk according to the invention.

Moreover, as illustrated by FIG. 5, the regular distribution of the studs 421 and 431 is provided such that the angle a1 separating the axes of symmetry of two studs of one row is equal to the angle a2 separating the axes of symmetry of two studs of the other row. It will additionally be noted that, according to the present embodiment, the angle separating the axis of symmetry of a stud of one row from a stud directly adjacent to the other row is equal to half of the angle a1 (and hence also of the angle a2).

Moreover, the studs 421 of the upstream row 42 are preferably arranged in such a way that the spaces between them are angularly offset in relation to the air inlet openings 44 between the plates of the disk.

As can be seen, the upstream row is provided such that the axis of symmetry of one air inlet opening 44 coincides with the axis of symmetry of a stud 421 of the upstream row, a stud 421 being interposed between two studs 421 positioned facing two adjacent openings 44.

Figure 9:
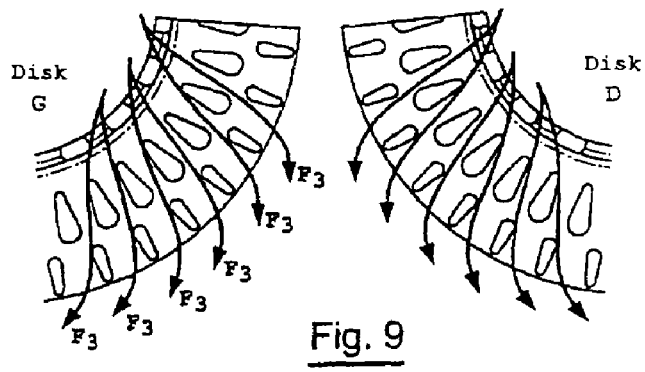
FIG. 9 is a partial view of left and right disks according to the invention, intended to illustrate an effect of the studs upon the air flows.

According to another characteristic, the studs 431 of the outlet row 43, the studs 421 of the upstream row 42 and the openings 44 are placed in a staggered arrangement in relation to one another (as demonstrated in FIG. 9).

Nevertheless, it is conceivable to offset the openings 44 so as to have a maximum air intake, in terms of flow and velocity, if the aerodynamics of the wheel assembly so demand.

In the case of a brake of "straight bowl" architecture, moreover, the openings 44 do not exist (the present embodiment relating to an inverted-bowl disk).

In addition, the use of the studs with an "inverted-bowl" disk (as represented in FIG. 4) without openings 44 is equally possible.

Thus, by virtue of the structure of the ventilated disk which has just been described, an "air pump" effect is obtained, the ventilated disk acting as a turbine, as illustrated by the arrows F3 indicated in FIG. 9.

It can additionally be seen that this effect is obtained with a single disk structure, whether said disk is mounted on a right-side wheel or on a left-side wheel.

It will also be noted that the disk which has just been described allows a reduction in the deformations likely to be suffered by the plates of the disk.

This is illustrated by FIGS. 10a, 10b, 11a and 11b.

Figure 11A:
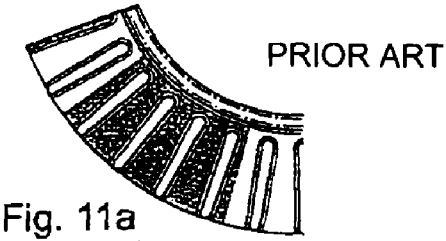
FIGS. 11a and 11b are views of a disk according to the prior art, intended to illustrate the deformations prone to appear under the action of a brake lining.
Figure 10B:
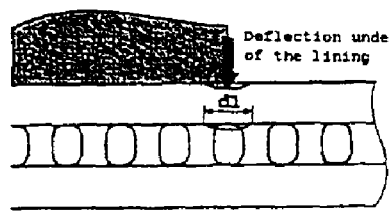
Figure 11B:
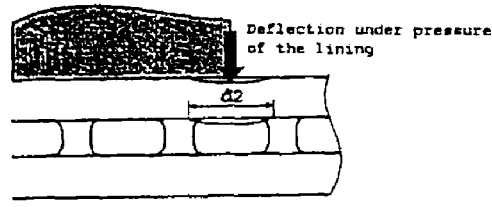

With a vaned disk of the prior art, such as is illustrated by FIG. 11a traditionally comprising 36 ventilation vanes, a deformation corresponding to a deflection under pressure of the lining capable of extending over a distance d2 is found (FIG. 11b).

Figure 10A:
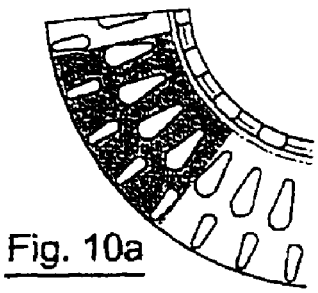
FIGS. 10a and 10b are views of a disk according to the invention, intended to illustrate the deformations prone to appear under the action of a brake lining.

With a disk according to the invention such as that illustrated by FIG. 10a, comprising, by way of indication, 72 ventilation studs, a deformation corresponding to a deflection capable of extending over a distance d1 (FIG. 10b) substantially less than the distance d2 is found.

According to yet another characteristic, the outlet row 43 and the upstream row 42 are separated from one another by a ring 45 inside which none of the studs or one or other of the two rows extends. In other words, the ends of the studs of the two rows, in the transition zone from the ring 420 to the ring 430, are not aligned on a common circle.

The invention claimed is:

1. A brake disk, comprising:
   two mutually spaced plates connected to one another by ventilation studs distributed in concentric circular rows, including an outlet row of studs, through which air leaves the space between the plates, and an upstream row of studs, upstream of the outlet row in a direction of air flow, the studs of the upstream row being angularly offset from the studs of the outlet row,
   wherein the studs of the upstream row have an oblong shape, the perimeter of which is delimited by two rounded ends connected by two rectilinear portions, the rounded ends being continuously curved from a first one of the two rectilinear portions to a second one of the two rectilinear portions and having, transversely, distinct dimensions, such that the studs have a progressive widening in the direction of the airflow continuously from a first one of the rounded ends to a second one of the rounded ends to compress air entering through air inlet openings between the plates, and the studs of the outlet row have an oblong shape, the perimeter of which is delimited by two rounded ends connected by two rectilinear portions, the rounded ends being continuously curved from a first one of the two rectilinear portions to a second one of the two rectilinear portions and having, transversely, distinct dimensions, such that the studs have a progressive narrowing in the direction of airflow continuously from a first one of the rounded ends to a second one of the rounded ends to aspirate and then evacuate the compressed air from the space between the plates, and
   wherein each of the air inlet openings face one of the studs of the upstream row such that an axis of symmetry of each of the air inlet openings coincides with an axis of symmetry of one of the studs of the upstream row, and one of the studs of the upstream row is positioned between two of the studs of the upstream row facing two adjacent air inlet openings.

2. The brake disk as claimed in claim 1, wherein the studs of the upstream row delimit spaces between adjacent studs of the upstream row, the width of the spaces decreasing in the direction of the outlet row.

3. The brake disk as claimed in claim 1, wherein the axis of symmetry of each of the studs of the upstream row corresponds to a radius of the disk.

4. The brake disk as claimed in claim 1, wherein the studs of the outlet row delimit spaces between adjacent studs of the outlet row, the width of the spaces increasing in the direction of the periphery of the disk.

5. The brake disk as claimed in claim 4, wherein the studs of the outlet row have an axis of symmetry corresponding to a radius of the disk.

6. The brake disk as claimed in claim 5, wherein the axis of symmetry of each stud of a row is angularly centered between the axes of symmetry of the adjacent studs of the other row.

7. The brake disk as claimed in claim 1, wherein the outlet row and the upstream row are separated from one another by an intermediate ring extending around a circumference of the brake disk such that the outlet row does not overlap the upstream row in a circumferential direction of the brake disk.

8. The brake disk as claimed in claim 1, wherein the studs of the outlet row, the studs of the upstream row, and the air inlet openings between the plates are arranged staggered in relation to one another.

9. The brake disk as claimed in claim 1, wherein the studs of the outlet row and the studs of the upstream row are distributed according to a regular pitch.

10. The brake disk as claimed in claim 1, wherein the studs of the outlet row and the studs of the upstream row are distributed according to a variable pitch.

11. An automotive vehicle, comprising:
    at least one brake disk comprising:
       two mutually spaced plates connected to one another by ventilation studs distributed in concentric circular rows, including an outlet row of studs through which air leaves the space between the plates, and an upstream row of studs upstream of the outlet row in a direction of air flow, the studs of the upstream row being angularly offset from the studs of the outlet row,
       wherein the studs of the upstream row have an oblong shape, the perimeter of which is delimited by two rounded ends connected by two rectilinear portions, the rounded ends being continuously curved from a first one of the two rectilinear portions to a second one of the two rectilinear portions and having, transversely, distinct dimensions, such that the studs have a progressive widening in the direction of the airflow continuously from a first one of the rounded ends to a second one of the rounded ends to compress air entering through air inlet openings between the plates, and the studs of the outlet row have an oblong shape, the perimeter of which is delimited by two rounded ends connected by two rectilinear portions, the rounded ends being continuously curved from a first one of the two rectilinear portions to a second one of the two rectilinear portions and having, transversely, distinct dimensions, such that the studs have a progressive narrowing in the direction of the airflow continuously from a first one of the rounded ends to a second one of the rounded ends to aspirate and then evacuate the compressed air from the space between the plates, and wherein each of the air inlet openings face one of the studs of the upstream row such that an axis of symmetry of each of the air inlet openings coincides with an axis of symmetry of one of the studs of the upstream row, and one of the studs of the upstream row is positioned between two of the studs of the upstream row facing two adjacent air inlet openings.

12. The brake disk as claimed in claim 1, wherein the studs of the upstream row are the most upstream studs on the brake disk in the direction of air flow, the studs of the outlet row are the most downstream studs on the brake disk in the direction of air flow, and and no studs are positioned between the upstream row and the downstream row in the direction of air flow.

13. The brake disk as claimed in claim 7, wherein the studs of the upstream row are the most upstream studs on the brake disk in the direction of air flow, the studs of the outlet row are the most downstream studs on the brake disk in the direction of air flow, and and no studs are positioned between the upstream row and the downstream row in the direction of air flow.

14. The automotive vehicle as claimed in claim 11, wherein the studs of the upstream row are the most upstream studs on the brake disk in the direction of air flow, the studs of the outlet row are the most downstream studs on the brake disk in the direction of air flow, and and no studs are positioned between the upstream row and the downstream row in the direction of air flow.

* * * * *